US012662323B2

(12) United States Patent
Pattillo et al.

(10) Patent No.: US 12,662,323 B2
(45) Date of Patent: Jun. 23, 2026

(54) CONVEYOR WITH DIRECTIONAL FOLD

(71) Applicant: Rocky Mountain Investor Holdings, Inc., Greenwood Village, CO (US)

(72) Inventors: Daniel R. Pattillo, Englewood, CO (US); Marcus Dacar, Whitewood, SD (US); Wes Cornell, Richmond, TX (US)

(73) Assignee: Rocky Mountain Investor Holdings, Inc., Centennial, CO (US)

( * ) Notice: Subject to any disclaimer, the term of this patent is extended or adjusted under 35 U.S.C. 154(b) by 212 days.

(21) Appl. No.: 18/411,812

(22) Filed: Jan. 12, 2024

(65) Prior Publication Data

US 2025/0229991 A1    Jul. 17, 2025

(51) Int. Cl.
*B65G 21/14*        (2006.01)

(52) U.S. Cl.
CPC .... *B65G 21/14* (2013.01); *B65G 2812/02019* (2013.01)

(58) Field of Classification Search
CPC .......... B65G 21/14; B65G 2812/02019; B65G 21/10; B65G 41/002; B65G 41/008
See application file for complete search history.

(56) References Cited

U.S. PATENT DOCUMENTS 3,616,893 A * 11/1971 Knadle .................. B65G 21/14
198/632

3,623,597 A * 11/1971 Arndt ..................... B65G 21/14
198/316.1
6,129,196 A * 10/2000 Lapper ................. B65G 41/008
198/313

(Continued)

FOREIGN PATENT DOCUMENTS

CA        2250730 A1 * 1/2000 .......... B65G 41/008
CN    201647557 U    11/2010

(Continued)

OTHER PUBLICATIONS

Safe Conveyor, Inc., Incline Conveyor, Oct. 17, 2022, 2 pages, https://safeconveyor.com/Modular-Incline-Conveyor.php, Swansea, Massachusetts.

(Continued)

*Primary Examiner* — Gene O Crawford
*Assistant Examiner* — Abby A Jorgensen
(74) *Attorney, Agent, or Firm* — AVEK IP, LLC

(57)        ABSTRACT

A foldable conveyor has a static conveyor housing section and a foldable conveyor housing section. The static conveyor housing section includes a substantially horizontal portion and an inclined portion, and the foldable conveyor housing section is selectively rotatable between an operational configuration and a transportation configuration. In the operational configuration, the foldable conveyor housing section is angled, while in the transportation configuration the foldable conveyor housing section is substantially horizontal. The conveyor also includes a conveyor belt operably associated with each of the static conveyor housing section and the foldable conveyor housing section, and a frame for supporting the static conveyor housing section and the foldable conveyor housing section.

16 Claims, 10 Drawing Sheets

(56)                    References Cited

U.S. PATENT DOCUMENTS

| | | | | |
|---|---|---|---|---|
| 6,186,311 B1 * | 2/2001 | Conner | B65G 21/14 | |
| | | | 198/300 | |
| 6,360,876 B1 * | 3/2002 | Nohl | B65G 69/10 | |
| | | | 198/588 | |
| 8,408,377 B2 * | 4/2013 | Werlinger | B65G 41/002 | |
| | | | 198/312 | |
| 10,556,752 B1 * | 2/2020 | McCloskey | B65G 65/28 | |
| 10,865,049 B2 * | 12/2020 | Grimm | B65G 21/14 | |
| 11,459,193 B1 * | 10/2022 | Rice | B65G 65/28 | |
| 2007/0267273 A1 * | 11/2007 | Walsh | B65G 21/14 | |
| | | | 198/632 | |
| 2017/0327024 A1 * | 11/2017 | Ozinga | B65G 41/002 | |
| 2018/0118466 A1 | 5/2018 | Chen et al. | | |

FOREIGN PATENT DOCUMENTS

| | | | | | |
|---|---|---|---|---|---|
| CN | 203033375 U | 7/2013 | | | |
| CN | 104495233 A | 9/2016 | | | |
| CN | 206156221 U | 5/2017 | | | |
| CN | 107651372 A | 2/2018 | | | |
| CN | 208731883 U | 4/2019 | | | |
| CN | 210635200 U | 5/2020 | | | |
| CN | 111348373 A | 6/2020 | | | |
| EP | 2894116 A1 * | 7/2015 | | B65G 23/44 | |
| WO | WO-9109797 A1 * | 7/1991 | | B65G 21/14 | |
| WO | WO-0236461 A1 * | 5/2002 | | B65G 21/14 | |
| WO | WO-2008124946 A1 * | 10/2008 | | B07C 7/04 | |
| WO | WO-2017223253 A1 * | 12/2017 | | B65G 41/005 | |

OTHER PUBLICATIONS

Sebright Products Inc, Custom Conveyors for Unique Applications, 2022, 5 pages, https://www.sebrightproducts.com/, Hopkins, Michigan.

Urban Kovo S.R.O., Urban TR110 With Folding Conveyor 4,1 M Backwards, Oct. 17, 2022, 4 pages, http://www.branch-logger.com/urban-tr110-with-folding-conveyor-4-1-m-backwards-83209.html, Lovcice, Czechia.

* cited by examiner

CONVEYOR WITH DIRECTIONAL FOLD

FIELD OF THE DISCLOSURE

The disclosure relates generally to the field of conveyors. More specifically, the disclosure relates to a conveyor having a directional fold.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

According to an embodiment, a foldable belt-type conveyor includes a frame and a first conveyor housing section connected to the frame. A second conveyor housing section is connected to the frame and to the first conveyor housing section, and at least a portion of the second housing section is inclined at a substantially fixed angle relative to horizontal. A third conveyor housing section is pivotally connected to the frame by a linkage assembly. The linkage assembly includes a mounting structure disposed on an underside of the third conveyor housing section; a vertical support rigidly connected to the frame at a first end and pivotally connected to the mounting structure at a second end; and a telescoping arm pivotally connected to the frame at a first end and pivotally connected to the mounting structure at a second end. A support leg is pivotally coupled to the underside of the third conveyor housing section, and a height of the support leg is selectively adjustable. A conveyor belt is operably associated with each of the first conveyor housing section, the second conveyor housing section, and the third conveyor housing section. The first conveyor housing section is configured to receive a conveying material upon the conveyor belt. The third conveyor housing section rotates between an operational configuration and a transportation configuration via the linkage assembly. In the operational configuration: the third conveyor housing section is substantially co-linear with the inclined portion of the second conveyor housing section; and the support leg is pivoted into a storage configuration whereby the support leg is substantially adjacent the third conveyor housing section. In the transportation configuration: the third conveyor housing section is substantially horizontal; and the support leg is pivoted into a substantially vertical configuration and the height is adjusted such that the support leg extends between the third conveyor housing section and a floor surface.

According to another embodiment, a conveyor has a static conveyor housing section and a foldable conveyor housing section. The static conveyor housing section includes a substantially horizontal portion and an inclined portion, and the foldable conveyor housing section is selectively rotatable between an operational configuration and a transportation configuration. In the operational configuration, the foldable conveyor housing section is angled, while in the transportation configuration the foldable conveyor housing section is substantially horizontal. The conveyor also includes a conveyor belt operably associated with each of the static conveyor housing section and the foldable conveyor housing section, and a frame for supporting the static conveyor housing section and the foldable conveyor housing section. The frame includes at least one locator tab which is configured to selectively engage with a material receiving bin to ensure accurate placement of the conveyor relative to the material receiving bin.

According to yet another embodiment, a method of moving material includes providing a foldable conveyor having a frame supporting a static conveyor housing section and a foldable conveyor housing section, a conveyor belt operably associated with the static conveyor housing section and the foldable conveyor housing section, a conveyor belt tensioning system operable to selectively adjust an amount of tension in the conveyor belt; wherein the foldable conveyor housing section includes a linkage assembly. The provided linkage assembly includes a first vertical support rigidly connected to the frame at a first end and pivotally connected to the foldable conveyor housing section at a second end, an inclined support connected to the frame at a first end and connected to the first vertical support at a second end. a telescoping arm pivotally connected to the frame and the foldable conveyor housing section, and a support member pivotally connected to the foldable conveyor housing section at a first end and having a roller disposed at a second end. The method includes providing at least one material storage bin configured to receive material, and extending the telescoping arm such that the support member roller travels along a length of the inclined support until the support member is in a substantially vertical orientation and the foldable conveyor housing section is upwardly angled. The method further includes depositing material onto the conveyor belt, and activating the conveyor belt to deposit the material into the at least one material storage bin.

BRIEF DESCRIPTION OF THE DRAWINGS

Illustrative embodiments of the invention are described in detail below with reference to the attached figures.

DETAILED DESCRIPTION

Figure 1:
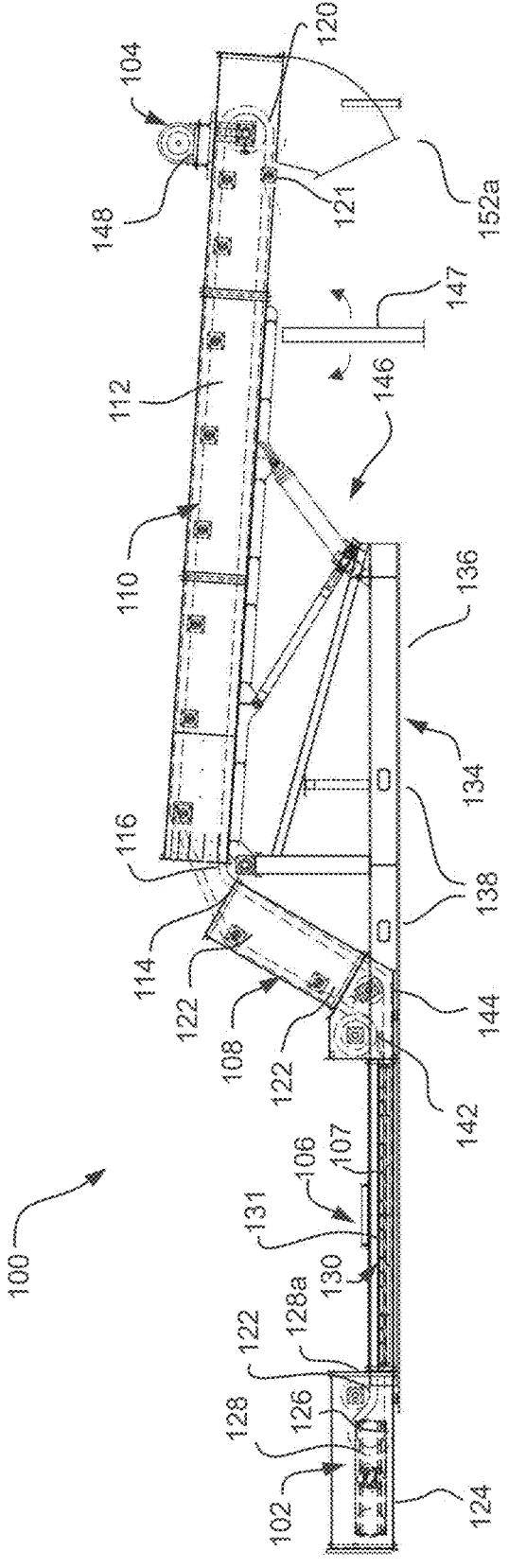
FIG. 1 is a side view of a folding conveyor in a storage or transportation configuration according to an embodiment of the invention.

Various drilling operations for oil and gas wells commonly utilize a hydraulic fracturing process to increase production from the well. During the fracturing process a hydraulic fluid or slurry comprising a mixture of fluids, chemicals, and proppants is mixed and pumped into the well bore. The solid proppants may often be in the form of dry or wet sand, although other proppants may be used where appropriate. Although the fracturing fluid's exact composition may vary depending on the application or nature of the well, generally the fracturing fluid is abrasive in nature. This abrasiveness often requires the fracturing fluid to be mixed or blended near the well site instead of being mixed off-site and pumped to the well. Therefore, the components of the fracturing fluid, such as the solid proppant, must be stored at or near the well site and be easily transportable between the components of a material storage system of the hydraulic fracturing system. The material storage system often includes a conveyor for transporting the solid proppant from an intermediate source (e.g., from a transport vehicle) to one or more bulk material storage bins for use in the mixing process. The conveyor is preferably transportable from a storage location to a work site and compatible with a plurality of material storage systems.

FIGS. 1-4 show an embodiment of a conveyor 100 forming part of a material storage system 200, which also includes one or more material storage containers (such as material storage container 172, described further below). The conveyor 100 is a belt-type conveyor configured to generally transport solid proppant, such as sand, for use in hydraulic fracturing applications, although the conveyor 100 may be used to transport any type of material. The conveyor 100 generally has a storage or transportation configuration, shown primarily in FIGS. 1 and 2, and an operational configuration, shown primarily in FIGS. 3 and 4. The conveyor has a proximal end 102 and a distal end 104, with the distal end 104 being elevated with respect to the proximal end 102 in both the transportation configuration and the operational configuration. The conveyor 100 generally includes three main portions: a substantially horizontal portion 106 which forms the proximal end 102, a static inclined portion 108 (which may alternatively be referred to as a transition portion), and a foldable portion 110 which includes the distal end 104. As is described in detail below, a belt 112 is operably arranged around a series of pulleys located along the respective lengths of the horizontal portion 106, the transition portion 108, and the foldable portion 110 to allow the belt 112 to rotate to deliver proppant or sand into a container.

The horizontal portion 106 of the conveyor 100 is configured to receive proppant or sand (or any other type of material). More specifically, the horizontal portion 106 of the conveyor 100 may include a designated loading area 130 which include a receiving hopper 131 which receives the proppant or sand. The loading area 130 is preferably accessible from above (i.e., not enclosed in a housing), such that the proppant may be either manually loaded onto the belt 112 or dispensed from an external container (e.g., a vehicle) into the hopper 131. In some embodiments, the loading area 130 may be covered by a filter or grate 132 (FIG. 3) in order to prevent unwanted debris from entering the belt 112. The loading area 130 may further include a gate 107 configured to selectively open and close based on a level of material in the material storage container 172. In embodiments, the gate 107 may be positioned below the receiving hopper 131 and above a top surface of the belt 112. When the gate 107 is open, material can freely flow through the receiving hopper 131 and onto the belt 112. When the gate 107 is closed, material is prevented from passing onto the belt 112, and may collect on the loading area 130 until the gate 107 is reopened. The gate 107 may be in operable communication with a sensor 171 in the storage container 172. When the material level in the storage bin 172 reaches the sensor 171

(or the sensor 171 determines that a material level in the storage bin 172 has reached a predetermined level), the gate 107 may be automatically closed to prevent the storage bin 172 from becoming over-filled, as material is no longer permitted to be deposited onto the belt 112. The gate 107 may be pneumatically actuated, or may be actuated in any other manner as is known to those of skill in the art.

In some embodiments, the loading area 130 may be configured to allow a truck to drive over it in order to facilitate dispensing of proppant onto the belt 112.

The horizontal portion 106 of conveyor 100 is supported by and rigidly connected to a frame 134. The frame 134 may be self-supported and may form part of a trailer chassis. The frame 134 includes first and second side rails 136 which in the illustrated embodiment extend generally horizontally from proximal end 102 and past the static inclined portion 108 of the conveyor 100. In some embodiments, the side rails 136 include first and second pockets or receptacles 138. The pockets 138 may be sized and spaced such that the tines of a forklift may slidably engage with the pockets 138 to allow for transportation of the conveyor 100 at a job site. The pockets 138 may extend through a width of the frame 134.

The proximal end 102 of the conveyor 100 may include a tensioning system 124 configured to move a proximal end idle pulley 126 along a substantially horizontal axis to vary tension in the belt 112, which is positioned around the idle pulley 126. The tensioning system 124 may include one or more linear actuators connected to the idle pulley 126, or an axle of the idle pulley 126, such that extension and/or contraction of the actuator(s) results in a substantially horizontal movement of the idle pulley 126. The actuator(s) may be any linear actuator now known or later developed, and may be manual, electrical, pneumatic, hydraulic, or any combination thereof without departing from the scope of the disclosure. The tensioning system 124 may be manually controlled (e.g., with a manual crank, via a valve in hydraulic or pneumatic embodiments, or a physical switch in electronic embodiments), or in some embodiments may be controlled externally by an electronic control system. The electronic control system may automatically extend or retract the actuator(s) based upon a characteristic or a desired characteristic of the conveyor, for example, the weight of the proppant on the belt 112, the position of the foldable portion 110, et cetera. Additionally, the control system may require adjustment of the tension in the belt 112 in response to a user input from a user interface, which may be located on the conveyor 100 or may be on a remote device (e.g., a smartphone or computer).

The tensioning system 124 may be contained within a housing 128 near the proximal end 102 of the conveyor 100. Furthermore, within or substantially within the housing 128, an idle pulley 122 may be operably positioned at the belt 112 to facilitate movement of the belt 112 around the pulley 126. The housing 128 is at least partially open on a first end 128a to allow the belt 112 to pass therethrough. The housing 128 may but need not have a substantially rectangular cross section.

Moving on, the static inclined portion 108 of the conveyor 100 serves primarily to transition the conveyor belt 112 from the substantially horizontal plane of the horizontal portion 106 to the inclined plane of the foldable portion 110. The inclined portion 108 may include one or more idle pulleys 122 which support the belt 112 and facilitate movement of the belt 112. The idle pulleys 122 may be mounted to or within a housing 140. To facilitate bends in the conveyor belt 112, there may be provided first and second pulleys 142 and 144, which may have a larger diameter compared to the idle pulleys 122. In the illustrated embodiment, the first pulley 142 is positioned above the uppermost surface of the belt 112, and the second pulley 144 is positioned between the upper and lower portions of the belt 112 such that the belt 112 folds about the pulleys 142, 144 into an inclined position. As shown, the pulley 144 has a larger diameter than the idle pulleys 122 but a smaller diameter than the pulley 142, although in other embodiments the relative diameters of pulleys 122, 142, and 144 may vary without departing from the scope of the invention. Pulleys 142 and 144 may be mounted to the housing 140 in a similar manner to the idle pulleys 122.

The static inclined portion 108 is substantially fixed at an angle relative to horizontal. The angle may be between about 0 and 90 degrees relative to horizontal, preferably between about 20 and 80 degrees relative to horizontal, more preferably between about 30 and 75 degrees relative to horizontal. By substantially fixed, it is meant that the static inclined portion 108 is maintained in an angled position relative to horizontal at all times, though the specific angle can selectively vary by about +/−10 degrees. In other words, for purposes of illustration, if the angle of the static inclined portion 108 is substantially fixed at an angle of about 45 degrees relative to horizontal, the angle may be selectively adjusted to about 35 degrees or about 55 degrees relative to horizontal.

The housing 140 may be open at both ends to allow the conveyor belt 112 and the conveying material to pass through. The housing 140 may be formed from a unitary piece of material, or in some embodiments it may be formed from a combination of pieces of material.

Figure 2:
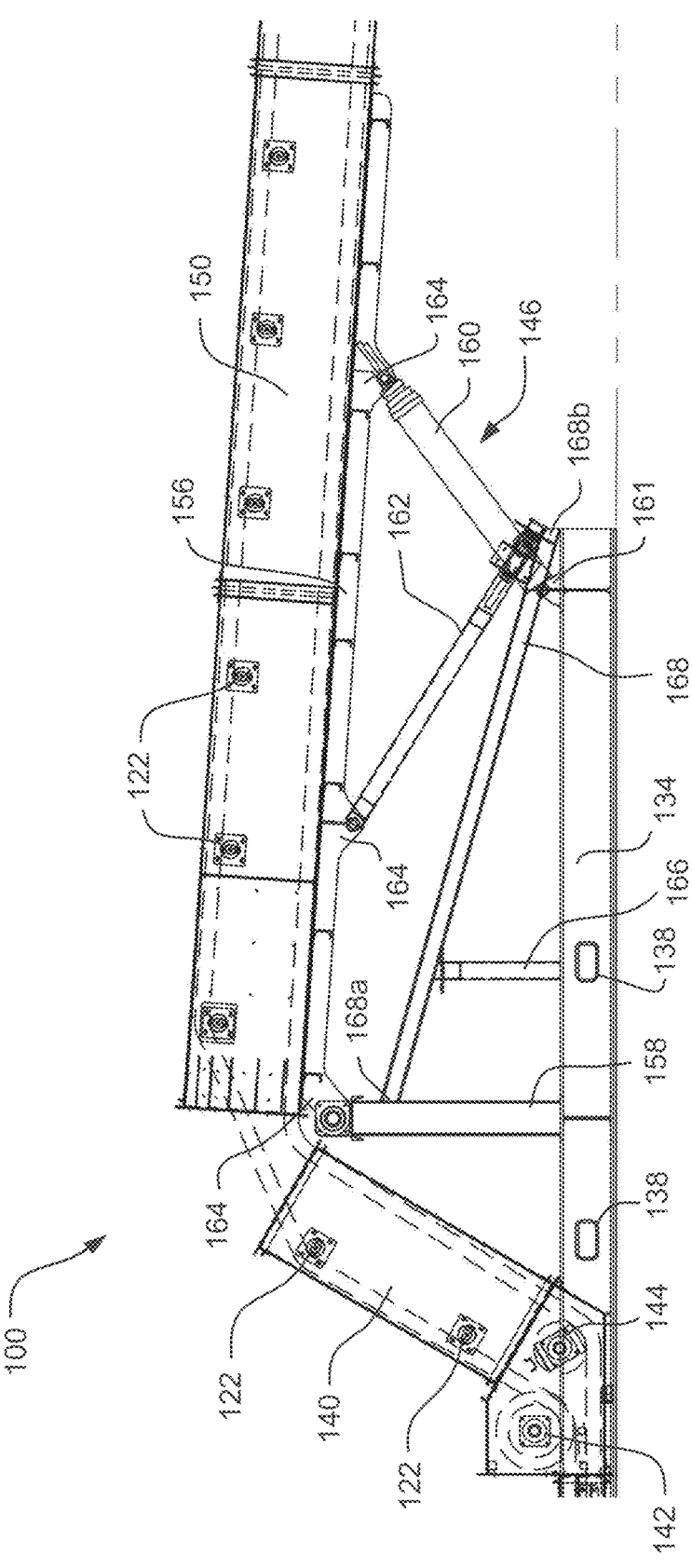
FIG. 2 is an enlarged partial side view of the folding conveyor of FIG. 1 in a storage or transportation configuration.
Figure 3:
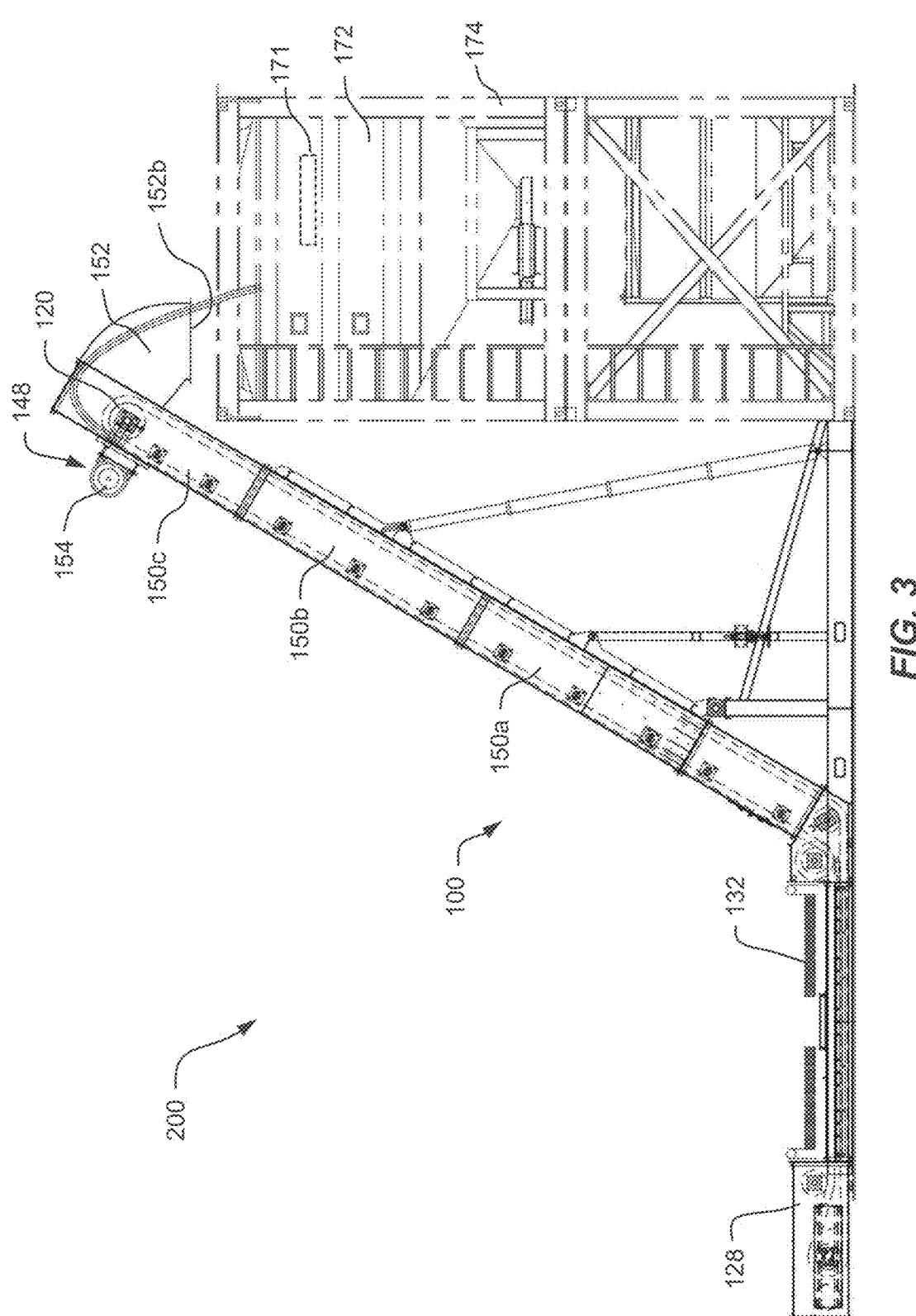
FIG. 3 is a side view of the folding conveyor of FIG. 1 in an operational configuration forming part of a material storage system according to an embodiment of the invention.
Figure 4:
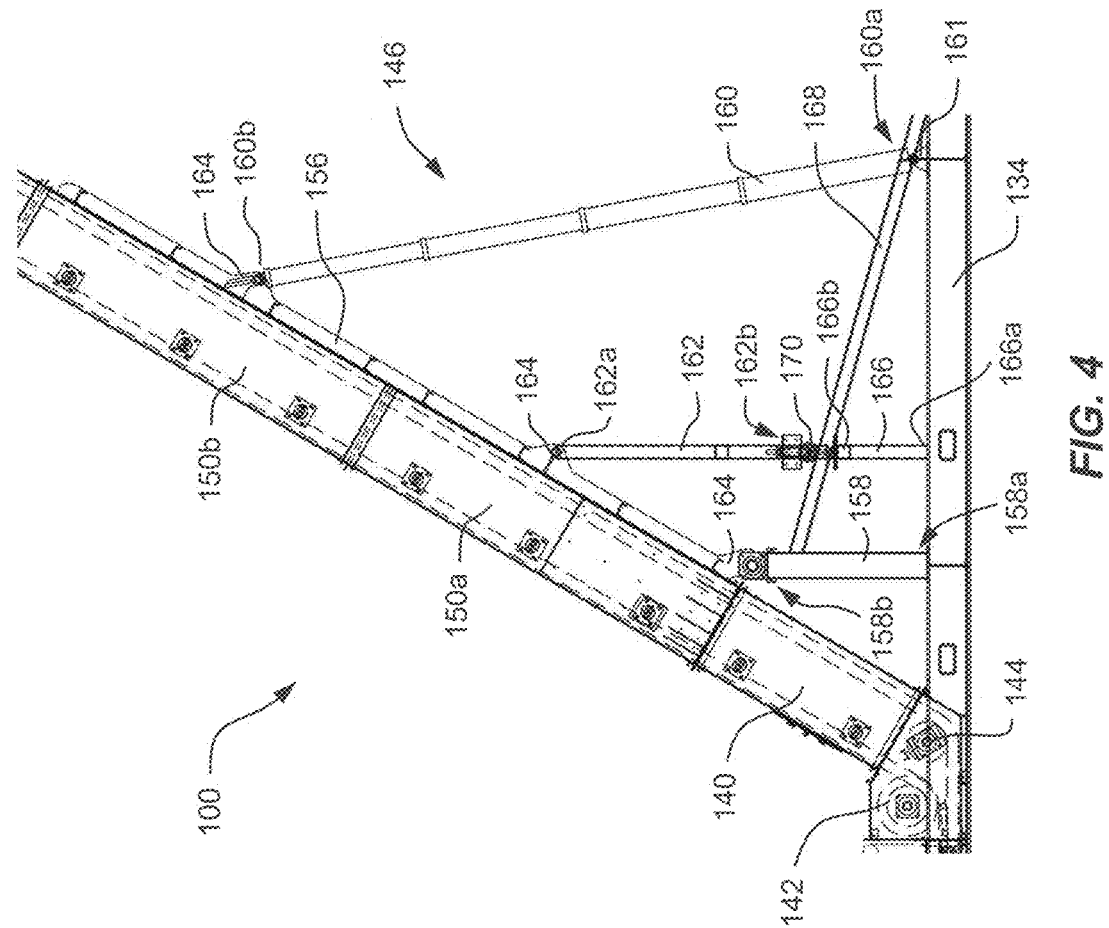
FIG. 4 is an enlarged partial side view of the folding conveyor of FIG.

The foldable conveyor portion 110 is movable between a storage or transportation configuration seen in FIGS. 1 and 2 and an operational configuration seen in FIGS. 3 and 4. The foldable conveyor portion 110 is generally connected to the frame 134 by a folding linkage 146, shown most clearly in FIGS. 2-4. The foldable portion 110 generally contains the distal end of the belt 112 which is driven by a drive assembly 148. The foldable portion 110 also includes a discharge outlet 152 through which the sand or proppant is dispensed. The foldable portion 110 generally includes a housing 150 which encloses the belt 112, various idle rollers or idle pulleys 122, and a drive pulley 120. In the illustrated embodiment, the housing is formed from three sections 150a, 150b, and 150c, although in other embodiments the housing 150 may be formed from a single piece of material. The housing sections 150a, 150b, and 150c each have a plurality spaced-apart mounts for idle pulleys 122 which support the belt 112. The drive pulley 120, located near the distal end 104 of the conveyor 100, drives the belt (in conjunction with the drive assembly 148). In embodiments, an additional pulley 121, which may be an idle roller or idle pulley, may be positioned inbound of the drive pulley 120. The belt 112 may be wound around the pulley 121 such that a return side of the belt 112 contacts a top of the pulley 121, as shown in FIG. 1 by the dash-dot line. By winding the belt 112 around the pulley 121 in such a serpentine manner, the tension on the belt 112 is naturally increased thereby reducing the amount of belt-tightening required. Further, some of the weight of the belt 112 may be transferred away from the drive pulley 120.

The first two housing sections 150a and 150b are open on opposing ends in order to allow the belt 112 to pass through uninterrupted. The third housing section 150c is open on a first end, but is closed on a second end, instead having a discharge outlet 152 (also referred to as a chute) secured to the housing 150c in order to allow the proppant or sand to be discharged from the conveyor 100.

Figure 6A:
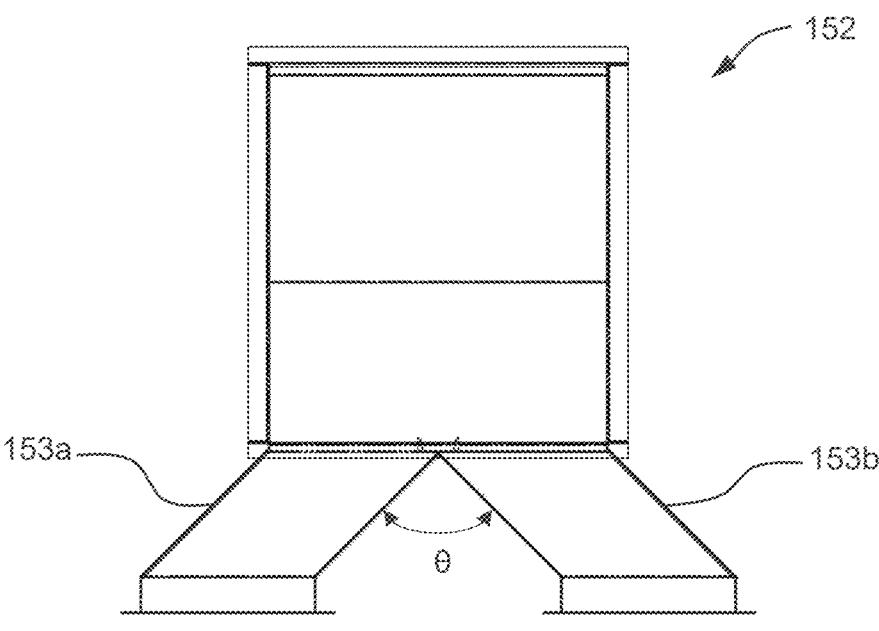
FIG. 6A is a front view of a discharge chute according to an embodiment of the invention.
Figure 6B:
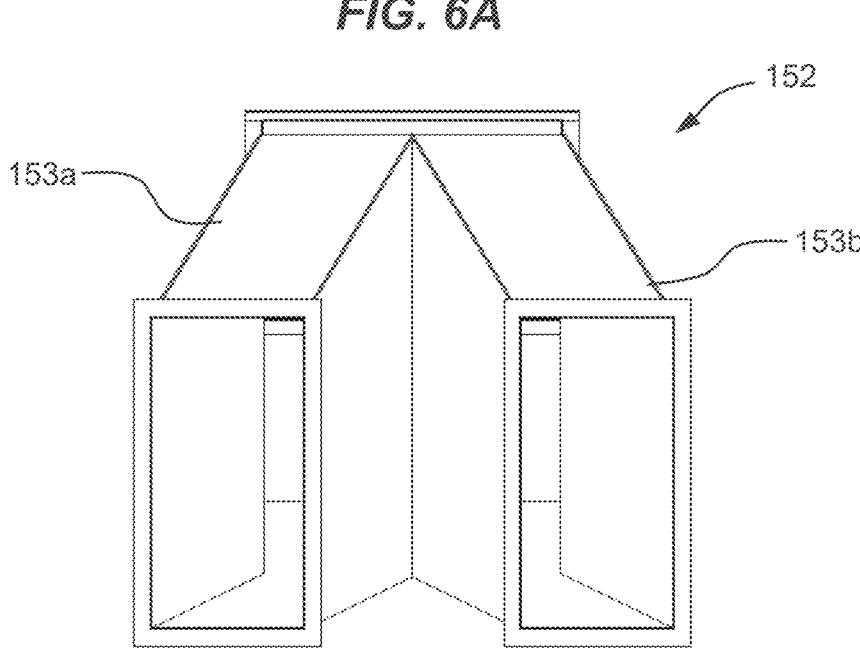
FIG. 6B is a bottom perspective view of the discharge chute of FIG. 6A.

As seen in FIGS. 1 and 3, the discharge outlet 152 may be generally arcuate in shape. The discharge outlet 152 may be formed such that when the foldable conveyor portion 110 is in the transportation configuration, the lowest edge 152a of the discharge outlet 152 is substantially coplanar to the lowermost surface of the frame 134 (as seen in FIG. 1); and when the foldable conveyor section 110 is in the operational configuration the lowest edge 152b of the discharge outlet 152 is substantially horizontal (as seen in FIG. 3). In embodiments, as shown in FIGS. 6A and 6B, the discharge outlet 152 has two discharge openings 153a and 153b in a split configuration. The discharge openings 153a and 153b extend outwardly from the center of the discharge outlet 152. An angle θ between the openings 153a and 153b may be approximately 90°. The discharge openings 153a and 153b allow material to be more evenly distributed into the storage bin 172. Even distribution of the material within the bin 172 may allow the storage bin 172 to hold more material, as the material does not stack up in the middle as is the case with a single-opening discharge chute.

Figure 7A:
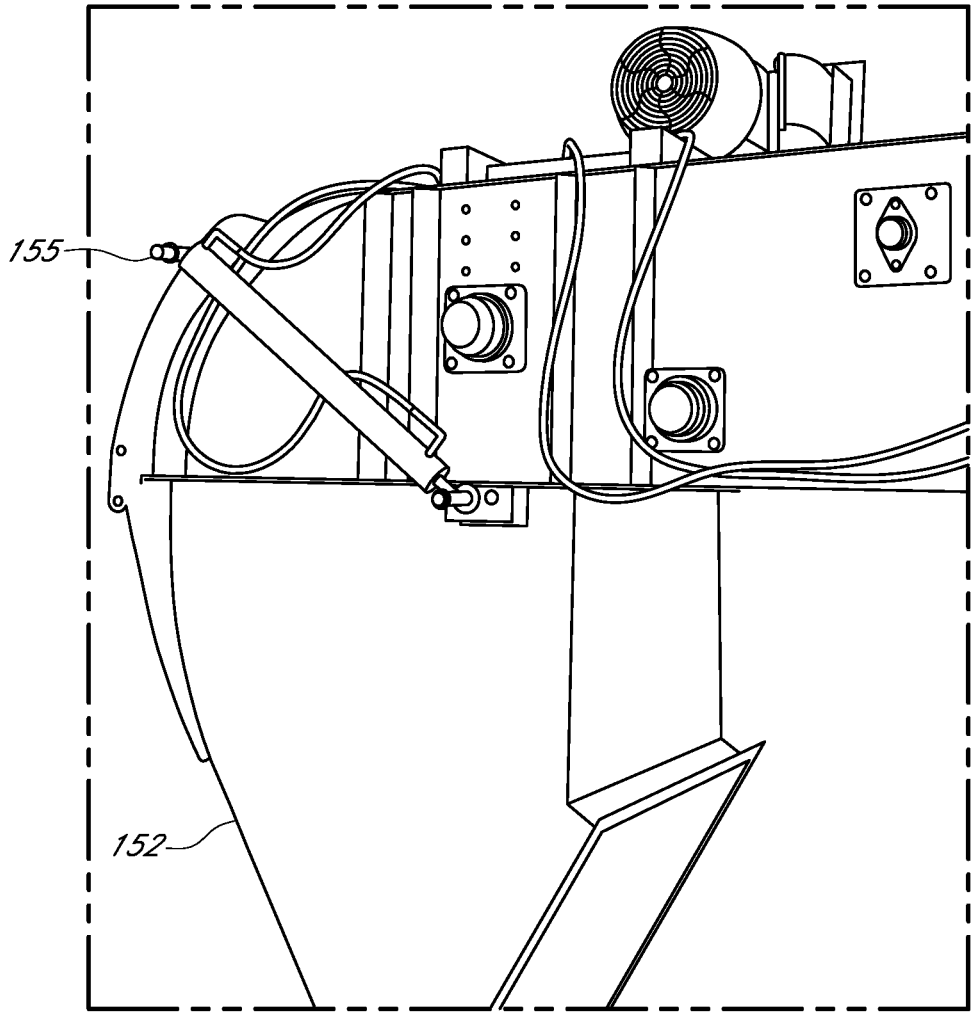
FIG. 7A illustrates a discharge chute with an actuator with the discharge chute in an operational configuration.
Figure 7B:
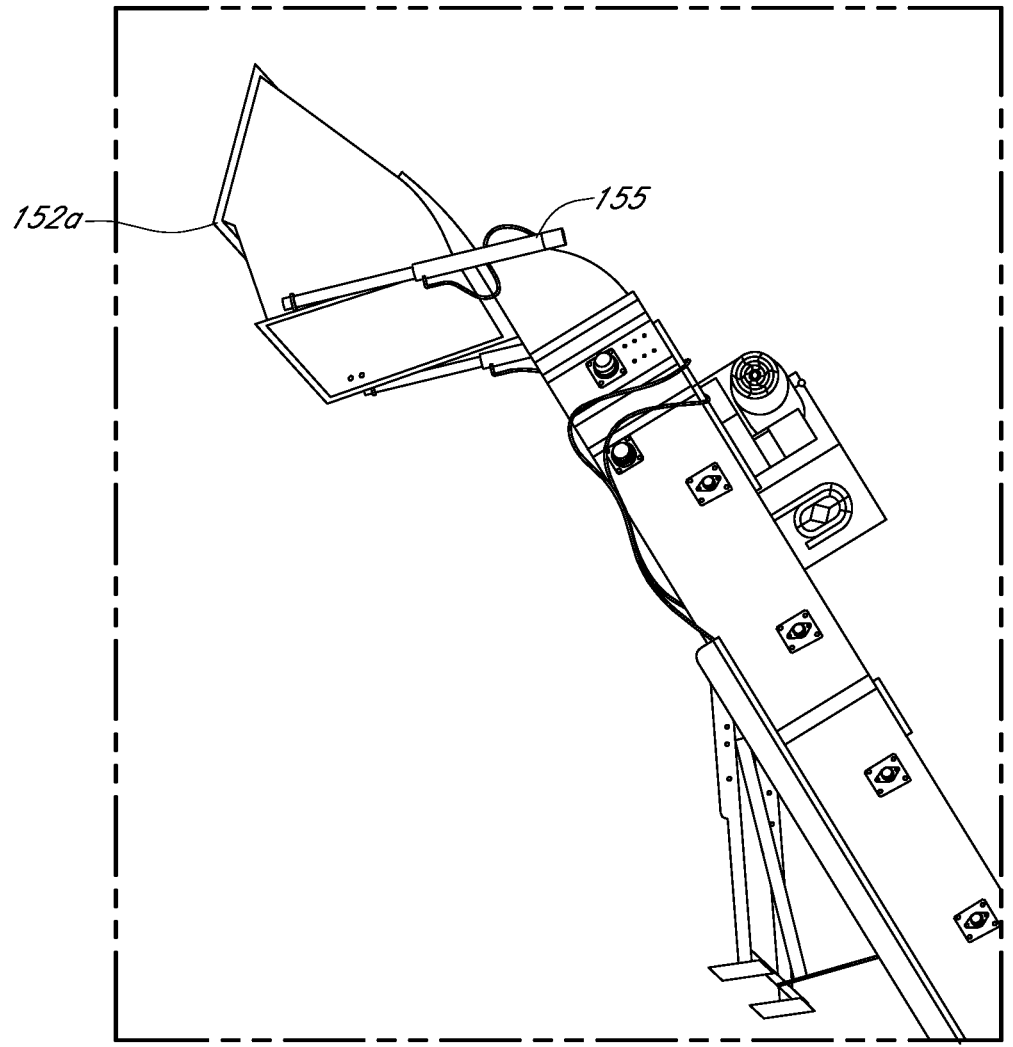
FIG. 7B illustrates the discharge chute of FIG. 7A in a rotated configuration.

One or more actuators 155 (e.g., hydraulic cylinders) may be secured between the chute 152 and the third housing section 150c and may be selectively activated to allow the chute 152 to rotate up and down relative to the third housing section 150c, as is illustrated in FIGS. 7A and 7B. In FIG. 7A, the discharge outlet 152 is rotated into an operational configuration. In FIG. 7B, the discharge outlet 152 is in a rotated configuration where the edge 152a is upwardly oriented. Rotating the discharge outlet 152 into the rotated configuration as shown in FIG. 7B may allow access to inspect the drive pulley 120. Moreover, when the conveyor 100 is being moved into position, having the discharge outlet 152 in the rotated configuration may provide additional clearance thereby prevent accidental contact between the discharge outlet 152 and the material storage bin 172.

The foldable conveyor portion 110 is connected to the frame 134 via a linkage assembly 146. With specific reference to FIG. 4, the linkage assembly 146 generally includes a mounting structure 156 connected to an underside of the foldable conveyor portion 110, and specifically to an underside of the housing 150. The mounting structure 156 may be substantially linear, and in the illustrated embodiment extends approximately from an end of the first housing segment 150a to an end of the second housing segment 150b. The mounting structure 156 is connected to various further elements of the linkage assembly 146, including a first vertical support 158, a telescoping arm 160, and a sliding support member 162 to allow for rotation of the foldable conveyor portion 110 between the transport and operational configurations.

The vertical support 158 is rigidly connected to the frame 134 at a first end 158a (e.g., by mechanical fasteners, welding, or other methods known in the art). The support 158 may be disposed between the fork pockets 138 on the frame 134. The mounting structure 156 is pivotally connected to a second end 158b of the vertical support 158. Preferably, the vertical support 158 connects to the mounting structure 156 at a location generally proximate the junction between the foldable conveyor portion 110 and the static inclined portion 108.

The telescoping arm 160 is pivotally connected to a pivot mount 161, located on the frame 134, at a first end 160a and is further pivotally connected to the mounting structure 156 at a second end 160b. The telescoping arm 160 may be passively operated, or may include a linear actuator of a known type (e.g., pneumatic, hydraulic, or electrically-operated) configured to automatically raise and lower the foldable conveyor portion 110 in response to a user input or when controlled by an electronic controller. In embodiments where the telescoping arm 160 includes an actuator controlled by an electronic controller, the controller may raise and/or lower the arm 160 based upon a characteristic of the conveyor 100, for example when the conveyor has not been used for a predetermined period of time, upon detection of a part failure, etc., or in response to a user input from an interface either disposed on the conveyor 100 or remotely located.

The linkage assembly 146 additionally includes a second vertical support 166 which is rigidly connected to the frame 134 at one end 166a and an inclined or angled support 168 at the opposing end 166b. The inclined support 168 may be connected to the vertical support 158 at a first end 168a and extend generally towards the distal end of the frame 134, where the inclined support 168 is connected to the frame 134 at a second end 168b near the pivot mount 161. In addition to providing structural reinforcement to the vertical support 158, the inclined support 168 may serve as a guide for the sliding support member 162 when the foldable conveyor portion 110 is raised and/or lowered.

To that end, the sliding support member 162 is rotatably connected to the mounting structure 156 at a first end 162a and includes a guide roller or wheel 170 disposed at a second end 162b. The wheel 170 is configured to roll along a length of the sliding support member 162 to move between a collapsed position, as shown in FIGS. 1 and 2, and a substantially vertical position as shown in FIGS. 3 and 4.

In some embodiments, such as that shown, the mounting structure 156 may include one or more nodes or projections 164 which extend away from the housing 150. In these embodiments, each of the vertical support 158, telescoping arm 160, and pivoting support member 162 may be connected to the mounting structure 156 at a respective projection 164.

The foldable portion 110 may further include a transport leg 147. The transport leg 147 may be pivotable, as shown by the arrows in FIG. 1, relative to the foldable portion 110 between a storage configuration in which the length of the transport leg 147 is substantially adjacent the foldable portion 110 (i.e. the transport leg 147 rests against the foldable portion 110) and a transport configuration in which the transport leg 147 is pivoted into a substantially vertical configuration. The height of the transport leg 147 may be selectively adjusted such that, in the transport configuration, the transport leg 147 touches the trailer chassis or other floor or ground surface in order to provide support to the foldable portion 110. The transport leg 147 ensures that the hydraulic cylinder is not weighed down during transport, and may also prevent the chute 152 from bearing weight when the foldable portion 110 is in the transportation configuration as described below. When not in use, the transport leg 147 may be pivoted toward the frame 110, and may be secured in storage configuration, e.g., via a clipping mechanism, a strap, or the like.

As mentioned, the conveyor 100 is a belt-type conveyor, and the belt 112 may be formed from rubber or a similar polymeric material now known or later developed. The belt 112, including any cleats, walls, or other features may be formed from a unitary piece of material. Forming the belt 112 from a unitary piece of material may increase the usable lifespan (e.g., reduce the risk of delamination) of the belt 112 compared to a belt fashioned from multiple pieces which are then adhered together, e.g., via glue or vulcanization.

In some embodiments the belt 112 may be smooth, while in other embodiments the belt 112 may be textured and/or include projections distributed along its length which aid the transport of loose particulates such as proppant or sand. The projections may be generally referred to as cleats and may extend outward from and generally normal to the exterior surface 114 of the belt 112. The cleats may be generally cylindrical or conical in shape, although a skilled artisan will appreciate that the cleats may resemble other three-dimensional forms without departing from the scope of the disclosure. In some embodiments, the belt 112 may have pre-formed dividers or walls which may extend across the width of the belt and are configured to contain a designated quantity of sand or proppant during operation of the conveyor 100.

The belt 112 may further include a raised sidewall 116 disposed along the edges of the belt 112 that extends upwards from the exterior surface to form a lip to keep sand or proppant on the exterior surface 114. The sidewall 116 may be smooth; however, in some embodiments the sidewall 116 may be textured and/or patterned. In some embodiments the sidewall 116 may be formed in a shape or pattern similar to that of a rack gear. In such embodiments, this may be done to ensure the alignment of the belt 112 is maintained during operation, and one or more pulleys may be formed in a complimentary gear shape. This includes the drive pulley 120 and any of the idle rollers or idle pulleys 122 which support the belt 112 at regular intervals along its length.

Movement of the conveyor belt 112 is controlled by a drive assembly 148, which generally includes a motor 154 and a belt drive pulley 120 which is drivingly connected to the belt 112. The motor 154 may be any type of motor known in the art, such as a hydraulic motor, electric motor, or other propulsion system now known or later developed. The motor 154 may be controlled manually (e.g., by buttons and/or switches located on the conveyor 100) or may be controlled through an electronic control system which may be remotely accessible by a user (e.g., from a smartphone or other graphical user interface). In some embodiments, the drive assembly 148 may further include a gearbox which connects the motor 154 to the drive pulley 120. The drive assembly 148 may be generally mounted to an exterior surface of the housing 150 near the distal end 104 of the conveyor 100, although a skilled artisan will appreciate that the drive assembly 148 may be placed elsewhere along the length of the conveyor 100 such that it facilitates movement of the belt 112 without departing from the scope of the disclosure.

To raise the foldable conveyor portion 110 into an operational configuration (e.g., as shown in FIGS. 3 and 4) from a transportation configuration (e.g., as shown in FIGS. 1 and 2), the telescoping arm 160 is extended. As the telescoping arm 160 is raised, the second end 160b of the telescoping arm 160 rotates counter-clockwise about the pivotal connection with the mounting structure 156. Extending the telescoping arm 160 causes the second end 162b of the sliding support member 162, and specifically the roller 170, to roll along the top surface of the inclined support 166. Such movement of the sliding support member 162 causes the first end 162a to rotate clockwise about the pivotal connection with the mounting structure 156. Upon reaching a predetermined location, or a substantial vertical orientation, the roller 170 and the sliding support member 162 may be releasably secured into position via a locking mechanism. In some embodiments, an additional restraint or locking mechanism may be employed to further secure the foldable conveyor portion 110 to the static inclined portion 108 of the conveyor 100.

To lower the foldable conveyor portion 110 from the operational configuration (e.g., FIGS. 3 and 4) into a trans- portation configuration (e.g., FIGS. 1 and 2), the foldable conveyor portion 110 may be released from the static inclined portion 108 (in embodiments where the foldable conveyor portion 110 is secured to the static inclined portion 108). If the sliding support member 162 is secured into the vertical position, it may be released thereby freeing the wheel 170 to roll along the inclined support 168. The telescoping arm 160 is collapsed, either automatically (i.e., without intervention) or via an actuator, which causes the second end 160*b* of the telescoping arm 160 to rotate clockwise about the pivotal connection with the mounting structure 156. Additionally, collapsing the telescoping arm 160 causes the first end 162*a* of the sliding support member 162 to rotate counter-clockwise about the pivotal connection with the mounting structure 156 and the wheel 170 to slide down the inclined support 168 thereby collapsing the sliding support 162. The entire foldable conveyor portion 110 rotates about the pivotal junction between the foldable conveyor portion 110 and the static inclined portion 108 to achieve the transportation configuration. In the transporta- tion configuration, the foldable conveyor portion 110 may be substantially horizontally oriented. As used herein in con- nection with the foldable conveyor portion 110, the term "substantially horizontally oriented" or "substantially hori- zontal" means horizontal +/− about 10 degrees (e.g., angled from about −10° to about 10° relative to horizontal).

Due to the folding nature of the conveyor 100 as described above, it may be necessary to adjust the tension in the belt 112 using the tensioning system 124 before operating the conveyor 100 and/or in order to fold the conveyor 100 into the transportation configuration. The tension in the belt 112 is adjusted as described above. Once the requisite belt tension is achieved, sand or proppant may be dispensed onto the conveyor at the loading area 130, and the conveyor belt 112 can be moved by the drive assembly 148 such that the sand or proppant is dispensed at the distal end 104 of the conveyor 100 at the discharge outlet 152.

Figure 5:
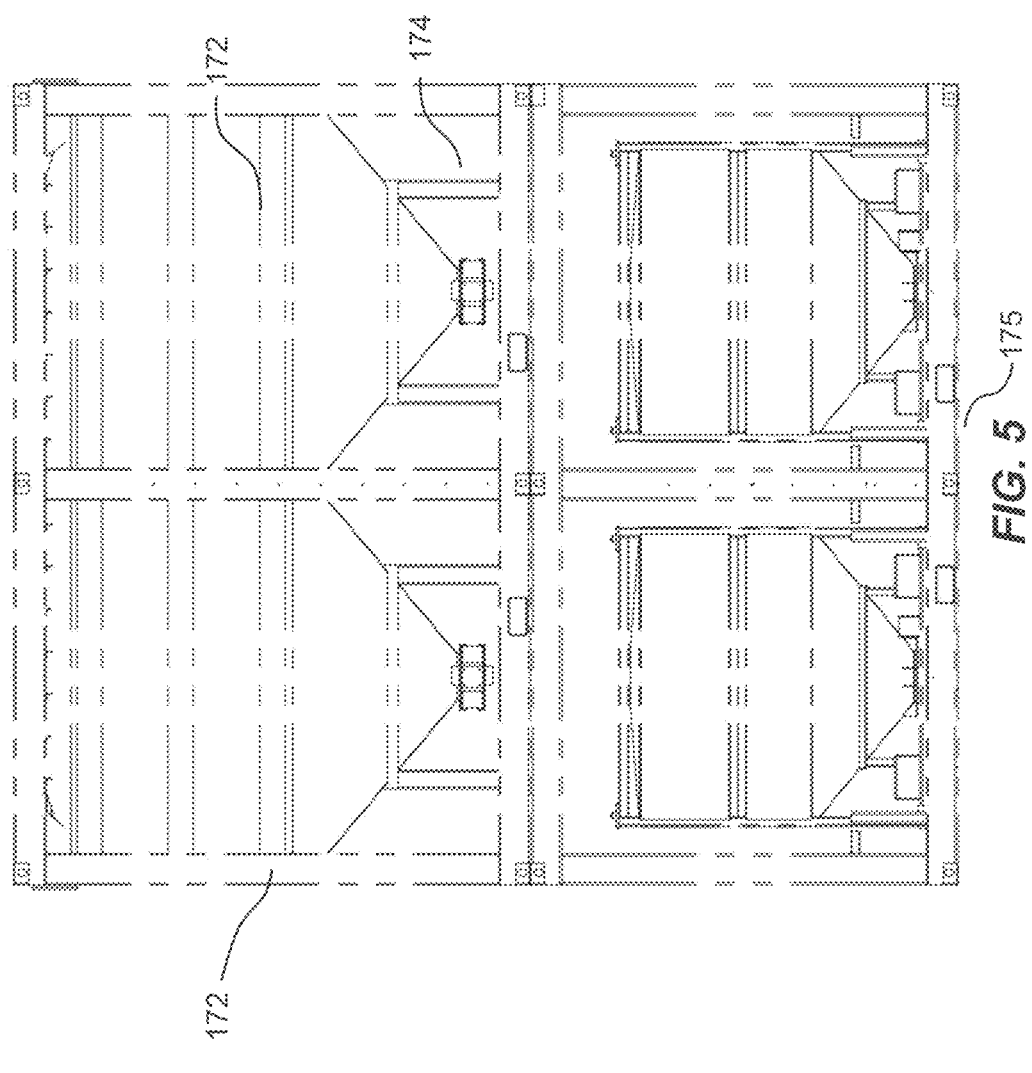
FIG. 5 is a front view of the material storage system of FIG. 3.

In some embodiments, the sand or proppant may be discharged into one or more storage bins 172 which, as noted above, form a part of a material storage system 200. These material storage bins 172 (as shown in FIGS. 3 and 5) are configured to receive the sand or proppant, and may be positioned near the frame 134 and beneath the discharge outlet 152. The bins 172 may be held in a storage bin frame 174 which is connected to the frame 134. In some embodi- ments, the material storage bins 172 may be equipped with sensors for detecting the type and/or quantity of material discharged by the conveyor 100. In these embodiments, the conveyor 100 and the material storage bins 172 may be connected to and in data communication with an automated electronic control system which may determine operating parameters of the conveyor 100, for example the speed of the belt 112. In such embodiments, the automated control system may additionally be configured to alert a user, e.g., through an audial or visual indicator located on the material storage system 200 or via a remote device, upon detection of a warning condition such as a component failure, full storage capacity, or various environmental hazards.

Figure 8A:
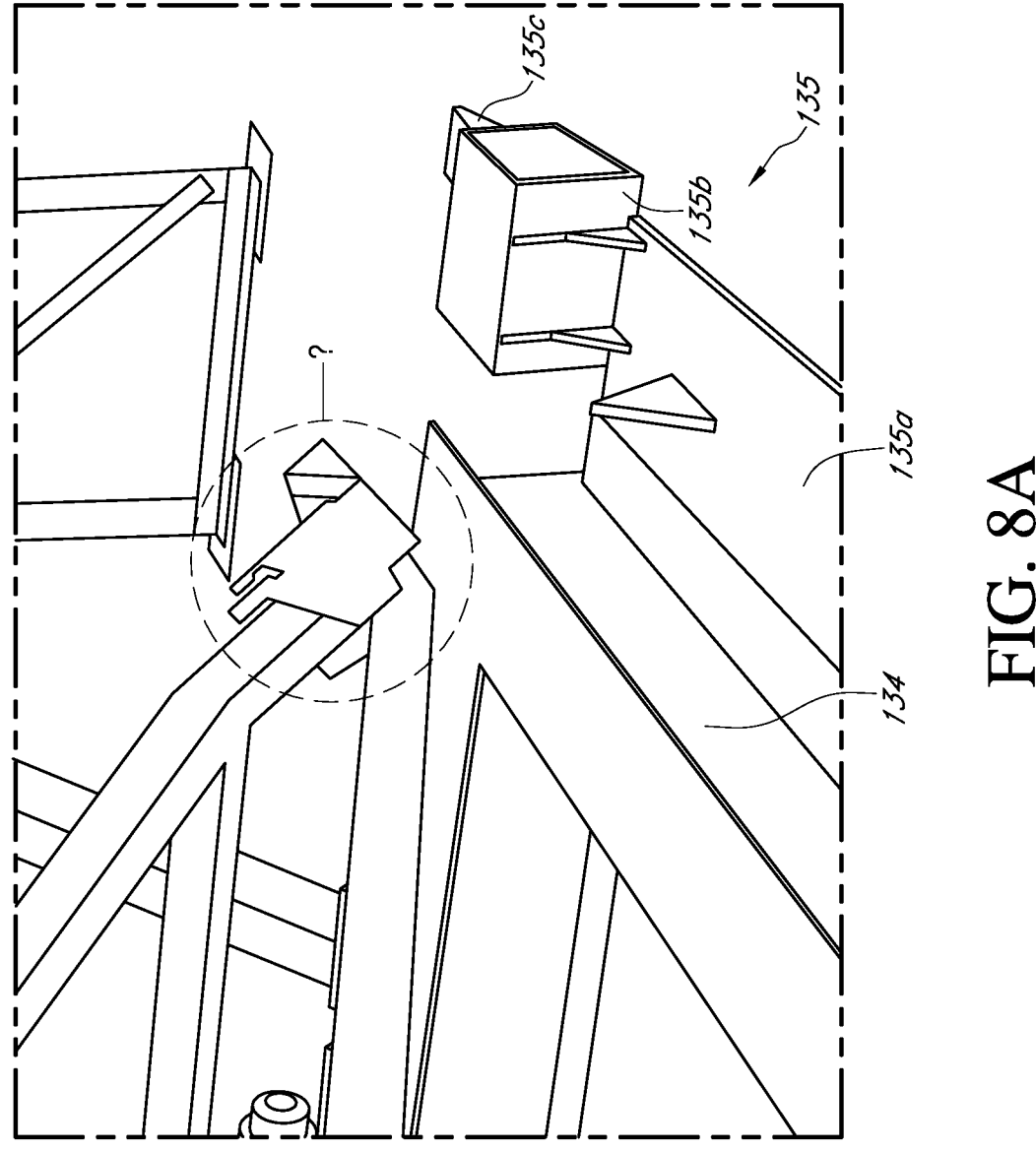
FIGS. 8A and 8B illustrate a locator tab on a frame of the conveyor according to an embodiment of the invention.
Figure 8B:
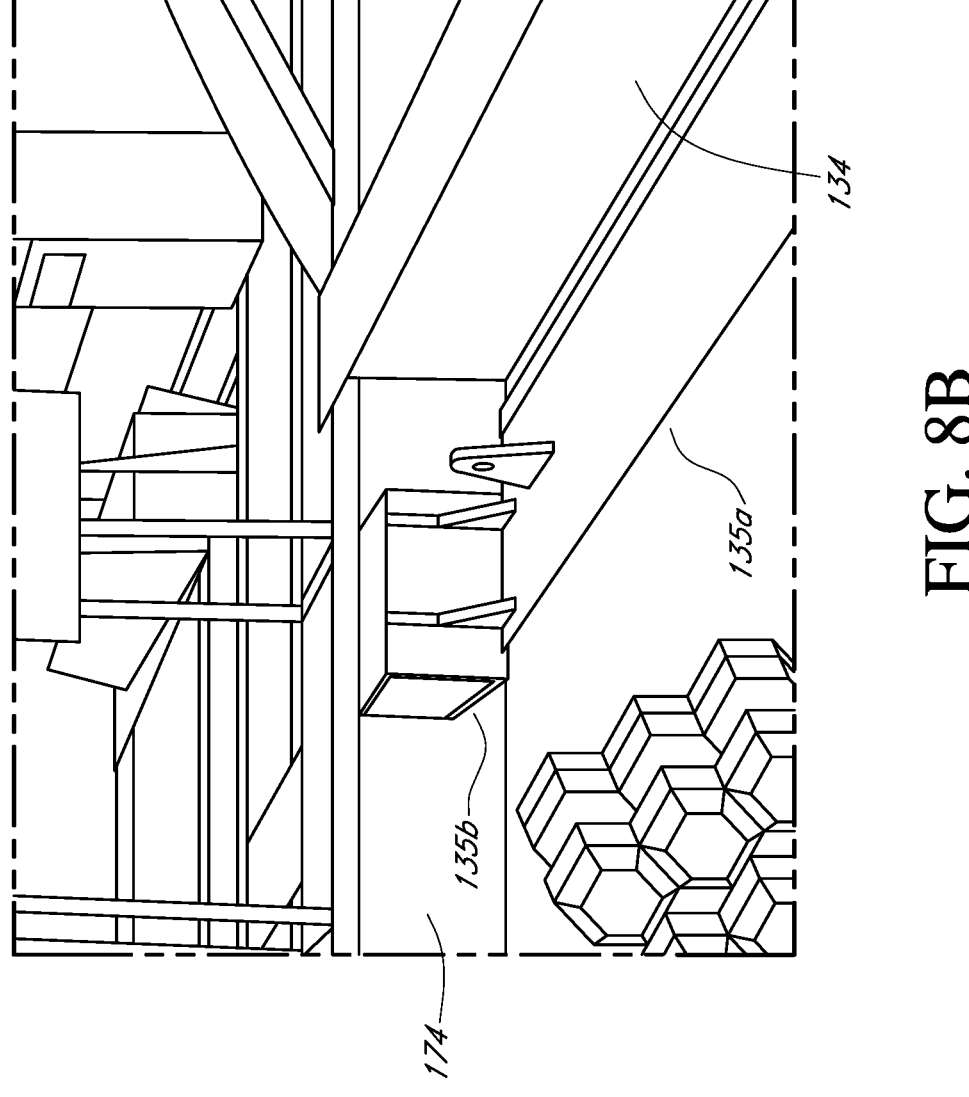

To accurately locate the conveyor 100 relative to the storage bins 172, the frame 134 may include one or more locator tabs 135 extending outwardly from and generally parallel to the end of the frame 134 closest to the discharge outlet 152. The locator tabs 135, illustrated generally in FIGS. 8A and 8B may include a support frame 135*a*, a stop 135*b*, and a tongue 135*c* extending beyond the stop 135*b*. The tongue 135*c* may engage with a corresponding opening 175 (FIG. 5) in the storage bin frame 174 as shown in FIG. 8B.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of imple- menting the aforementioned improvements without depart- ing from the scope of the present disclosure.

It will be understood that certain features and subcombi- nations are of utility and may be employed without reference to other features and subcombinations and are contemplated within the scope of the claims. Not all steps listed in the various figures need be carried out in the specific order described.

What is claimed is:

1. A foldable belt-type conveyor, the conveyor compris- ing:

a frame;

a first conveyor portion having a first housing section connected to the frame;

a second conveyor portion having a second housing section connected to the frame and to the first housing section, at least a portion of the second housing section being inclined at a substantially fixed angle relative to horizontal;

a third conveyor portion having a third housing section, the third housing section being pivotally connected to the frame by a linkage assembly, the linkage assembly comprising:

a mounting structure disposed on an underside of the third housing section;

a first vertical support rigidly connected to the frame at a first end and pivotally connected to the mounting structure at a second end;

a telescoping arm pivotally connected to the frame at a first end and pivotally connected to the mounting structure at a second end;

a second vertical support extending from the frame;

a sliding support member, the sliding support mem- ber being pivotally connected to the mounting structure at a first end and being releasably secur- able to the second vertical support at a second end; and an inclined support having a first end and a second end, wherein the first end is connected to the first vertical support and the second end is connected to the frame;

a support leg pivotally coupled to the underside of the third housing section, a height of the support leg being selectively adjustable; and a conveyor belt operably associated with each of the first conveyor portion, the second conveyor portion, and the third conveyor portion;

wherein:

the first conveyor portion is configured to receive a conveying material upon the conveyor belt;

the third housing section rotates between an operational configuration and a transportation configuration via the linkage assembly;

the sliding support member comprises a wheel disposed at the second end configured to engage with an upper surface of the inclined support when the third housing section is rotated between the transport configuration and the operational configuration;

in the operational configuration:

the third housing section is substantially co-linear with the inclined portion of the second housing section; and the support leg is pivoted into a storage configuration whereby the support leg is substantially adjacent the third housing section; and in the transportation configuration:

the third housing section is substantially horizontal; and the support leg is pivoted into a substantially vertical configuration and the height is adjusted such that the support leg extends between the third housing section and a floor surface.

2. The conveyor of claim 1, wherein the frame further comprises a pair of receptacles configured to slidably engage with a forklift.

3. The conveyor of claim 1, wherein the telescoping arm includes a linear actuator.

4. The conveyor of claim 3, wherein the linear actuator is connected to and in data communication with an electronic controller, and the electronic controller is configured to operate the linear actuator based upon a characteristic of the conveyor.

5. The conveyor of claim 1, further comprising a locking mechanism for securing the sliding support structure to the second conveyor portion.

6. The conveyor of claim 1, further comprising a tensioning system configured to selectively adjust an amount of tension on the conveyor belt.

7. The conveyor of claim 1, wherein the frame forms a part of a trailer chassis.

8. A conveyor, comprising:

a static conveyor housing section comprising a substantially horizontal portion and an inclined portion;

a foldable conveyor housing section, the foldable conveyor housing section being selectively rotatable between an operational configuration and a transportation configuration;

a linkage assembly configured to selectively rotate the foldable conveyor housing section between the operational configuration and the transportation configuration, the linkage assembly comprising:

a first vertical support rigidly connected to the frame at a first end, the foldable conveyor housing section being pivotally connected to a second end of the first vertical support; and a telescoping arm pivotally connected to the foldable conveyor housing section and to the frame, wherein the telescoping arm is configured to selectively raise and lower the foldable conveyor housing section;

an inclined support connected to the frame at a first end and to the first vertical support at a second end; and a support member pivotally connected to the foldable conveyor section at a first end and having a roller disposed at a second end, wherein the roller selectively moves along a length of the inclined support when the foldable conveyor housing section is rotated between the operational and transportation configurations;

a conveyor belt operably associated with each of the static conveyor housing section and the foldable conveyor housing section; and a frame for supporting the static conveyor housing section and the foldable conveyor housing section, the frame comprising at least one locator tab;

wherein:

in the operational configuration, the foldable conveyor housing section is angled;

in the transportation configuration, the foldable conveyor housing section is substantially horizontal; and the locator tab is configured to selectively engage with a material receiving bin to ensure accurate placement of the conveyor relative to the material receiving bin.

9. The conveyor of claim 8, further comprising a tensioning system configured to adjust an amount of tension on the conveyor belt.

10. The conveyor of claim 8, wherein the inclined portion of the static conveyor section and the foldable conveyor section (a) are selectively coupled to form a continuous enclosure when the foldable conveyor housing section is in an operational configuration, and (b) are selectively separated when the foldable conveyor housing section is in a transportation configuration.

11. A conveyor, comprising:

a static conveyor housing section comprising a substantially horizontal portion and an inclined portion;

a foldable conveyor housing section, the foldable conveyor housing section being selectively rotatable between an operational configuration and a transportation configuration;

a linkage assembly configured to selectively rotate the foldable conveyor housing section between the operational configuration and the transportation configuration, the linkage assembly comprising:

a first vertical support rigidly connected to the frame at a first end, the foldable conveyor housing section being pivotally connected to a second end of the first vertical support; and a telescoping arm pivotally connected to the foldable conveyor housing section and to the frame, wherein the telescoping arm is configured to selectively raise and lower the foldable conveyor housing section;

an inclined support connected to the frame at a first end and to the first vertical support at a second end; and a support member pivotally connected to the foldable conveyor section at a first end and having a roller disposed at a second end, wherein the roller selectively moves along a length of the inclined support when the foldable conveyor housing section is rotated between the operational and transportation configurations;

a conveyor belt operably associated with each of the static conveyor housing section and the foldable conveyor housing section; and a frame for supporting the static conveyor housing section and the foldable conveyor housing section, the frame comprising at least one locator tab;

wherein:

in the operational configuration, the foldable conveyor housing section is angled;

in the transportation configuration, the foldable conveyor housing section is substantially horizontal;

the locator tab is configured to selectively engage with a material receiving bin to ensure accurate placement of the conveyor relative to the material receiving bin; and the support member is selectively lockable in a substantially vertical orientation when the foldable conveyor housing section is in the operational configuration.

12. The conveyor of claim 8, wherein the frame forms a part of a trailer chassis.

13. A method of moving material, comprising:

providing a foldable conveyor having a frame supporting a static conveyor housing section and a foldable conveyor housing section, a conveyor belt operably associated with the static conveyor housing section and the foldable conveyor housing section, a conveyor belt tensioning system operable to selectively adjust an amount of tension in the conveyor belt; wherein the foldable conveyor housing section includes a linkage assembly, comprising:

a first vertical support rigidly connected to the frame at a first end and pivotally connected to the foldable conveyor housing section at a second end;

an inclined support connected to the frame at a first end and connected to the first vertical support at a second end;

a telescoping arm pivotally connected to the frame and the foldable conveyor section; and a support member pivotally connected to the foldable conveyor housing section at a first end and having a roller disposed at a second end;

providing at least one material storage bin configured to receive material;

extending the telescoping arm such that the support member roller travels along a length of the inclined support until the support member is in a substantially vertical orientation and the foldable conveyor housing section is upwardly angled;

depositing material onto the conveyor belt; and activating the conveyor belt to deposit the material into the at least one material storage bin.

14. The method of claim 13, further comprising releasably securing the support member in the substantially vertical orientation.

15. The method of claim 13, further comprising adjusting the tension in the conveyor belt via the belt tensioning system to a predetermined threshold tension based on a characteristic of the conveyor.

16. The method of claim 13, wherein the frame forms a part of a trailer chassis.

* * * * *